United States Patent [19]

Williams et al.

[11] Patent Number: 5,040,285
[45] Date of Patent: Aug. 20, 1991

[54] METHOD OF MANUFACTURING A MOTOR ELEMENT OF AN ELECTRIC MOTOR

[75] Inventors: John J. A. Williams; Frank W. Shacklock; Keith D. Ferguson; Roger A. Chalk, all of Auckland, New Zealand

[73] Assignee: Fisher & Paykel Limited, Auckland, New Zealand

[21] Appl. No.: 412,309

[22] Filed: Sep. 26, 1989

[30] Foreign Application Priority Data

Sep. 28, 1988 [NZ] New Zealand .................. 226374

[51] Int. Cl.⁵ ............................................. H02K 15/02
[52] U.S. Cl. ................................ 29/596; 264/272.2; 310/43; 310/254
[58] Field of Search ................. 29/596, 598; 310/154, 310/42, 43, 254, 258, 259; 264/272.19, 272.2

[56] References Cited

U.S. PATENT DOCUMENTS

| | | | |
|---|---|---|---|
| 2,588,963 | 12/1952 | Chapin . | |
| 3,002,261 | 10/1961 | Avila et al. | 29/596 X |
| 3,502,914 | 3/1970 | Cox | 29/596 X |
| 3,720,914 | 3/1973 | Hallerback | 310/43 |
| 3,932,929 | 1/1976 | Hallerback et al. | 29/596 |
| 4,573,258 | 3/1986 | Io et al. | 29/596 |
| 4,829,208 | 5/1989 | Uchino | 29/596 X |
| 4,835,840 | 6/1989 | Stokes | 310/43 X |
| 4,862,582 | 9/1989 | Henck | 29/596 |

FOREIGN PATENT DOCUMENTS

A-0239261 8/1987 European Pat. Off. .

Primary Examiner—Joseph M. Gorski
Attorney, Agent, or Firm—Fleit, Jacobson, Cohn, Price, Holman & Stern

[57] ABSTRACT

A method of manufacturing an electric motor stator (31) and rotor (43) including holding magnetic elements (29, 32, 53) thereof in position in dies and injecting a plastics material into the dies to provide bearing carrier mountings in the stator substantially concentric with pole faces (33) of the stator and poles of the rotor, providing a bearing (21) in the stator bearing carrier (27), mounting a shaft (13) in the bearing (21), with the shaft running in a further bearing mounting tube (6), and mounting the hub (51) of the rotor onto the shaft (13) so that operation of the motor drives the shaft. The motor and drive so made is mounted to drive an agitation and spin tub of a laundry machine.

8 Claims, 5 Drawing Sheets

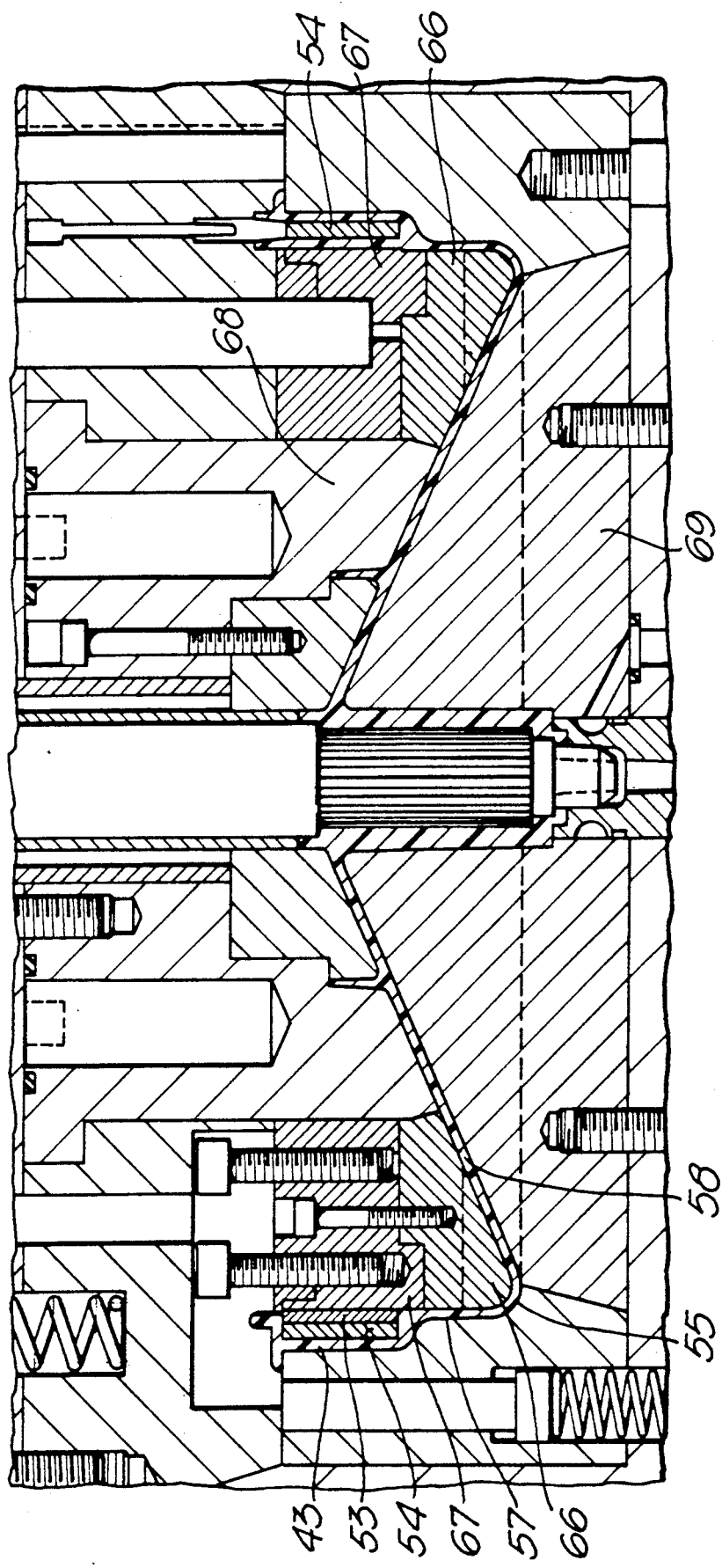

METHOD OF MANUFACTURING A MOTOR ELEMENT OF AN ELECTRIC MOTOR

BACKGROUND OF THE INVENTION

This invention relates to electric motors and methods of making machine drives utilizing such motors and has been devised particularly though not solely, for, making motors for use as a source of power and/or drive, for a laundry machine.

BRIEF SUMMARY OF THE INVENTION

It is an object of the present invention to provide an electric motor and/or a machine drive utilizing such a motor a method of making the same.

Accordingly in one aspect the invention consists in a method of manufacturing a motor element of an electric motor the motor element being selected from a rotor having a ferromagnetic circuit spaced radially from a shaft carrier mounting means and a stator having a ferromagnetic circuit including a set of poles adapted to receive electrical windings thereon, the poles being spaced radially from a shaft carrier mounting means thereof the comprising the steps of fixing the selected ferromagnetic circuit in a plastics injection moulding die, the die having walls defining a cavity to receive injection molded plastics material, the walls including wall portions to define a part of the cavity into which plastics material is injected to form the appropriate selected shaft carrier mounting means and injecting a plastics material into the die; to provide a plastics molding having embedded therein the ferromagnetic circuit; to form the shaft carrier mounting means and to form a web between the ferromagnaetic circuit and the shaft carrier mounting means the die holding desired parts of the ferromagnetic circuit in a fixed radial disposition relative to the shaft carrier mounting means to maintain substantial concentricity between the desired parts of the ferromagnetic circuit and the shaft carrier mounting means.

In a further aspect the invention consists in a method of manufacturing an electric motor comprising the steps of taking a motor element comprising a stator made by a method according to the preceding paragraph, placing electrical windings on the poles thereof and taking a further motor element comprising a rotor made according to the preceding paragraph, magnetizing part of the ferromagnetic circuit to a permanent magnet state, attaching the stator to a bearing housing containing a distal bearing separated from a proximal bearing, the outer surface of the proximal bearing being mounted partly in the shaft carrier mounting, mounting a shaft in the bearings and mounting the rotor when the shaft so that on the windings on the stator are energized through an electronic commutation circuit, the rotor is caused to rotate.

In a further aspect the invention consists in a motor element of an electric motor selected from a rotor having a ferromagnetic circuit spaced radially from a shaft carrier mounting means thereof and a stator having a ferromagnetic circuit including a set of poles adapted to receive electrical windings thereon the poles being spaced radially from a shaft carrier mounting means thereof the motor element comprising a plastics injection molding having embedded therein parts of the ferromagnetic circuit and having a web connecting the ferromagnetic circuit to the shaft carrier mounting means with parts of the ferromagnetic circuit held in a fixed radial disposition relative to the shaft carrier mounting means to maintain substantial concentricity between the desired parts of the ferromagnetic circuit and the shaft carrier mounting means.

In a still further aspect the invention consists in an electric motor comprising a motor element comprising a stator according to the preceding paragraph, the stator having electrical windings on the poles thereof and further motor elements comprising a rotor made according to the preceding paragraph, the motor having some of the ferromagnetic circuit magnetized to a permanent magnet state, a bearing housing attached to the stator, the housing containing a distal bearing separated from a proximal bearing, the outer surface of the proximal bearing being mounted partly in the bearing housing and partly in the shaft carrier mounting, a shaft in the bearings and the rotor being mounted on the shaft so that when windings on the poles of the stator are energized through an electronic commutating circuit magnetic coupling occurs to cause the rotor to rotate.

In a still further aspect the invention consists in a method for manufacturings a motor for a laundry machine having an outer casing, a water container within the casing, a spin tub rotatable within the container, an agitator mounted for agitation within the spin tub, the agitator being operable to enable the agitator alone to be agitated backwards and forwards or the spin tub and the the agitator to be rotated in a single and spinning speed, the agitator being driven by an electric motor according to the preceding paragraph, the shaft driving the agitator and the bearing housing being fixed to a lower part of the container.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWING

One preferred form of the invention will now be described with reference to the accompanying drawings wherein;

FIG. 3 is a schematic plan view of a stator forming part of an electric motor also shown in FIGS. 1 and 2;

FIG. 6 is an enlarged cross sectional view of an assembled die containing cavities in which a rotor according to the invention is molded.

DETAILED DESCRIPTION

Figure 1:
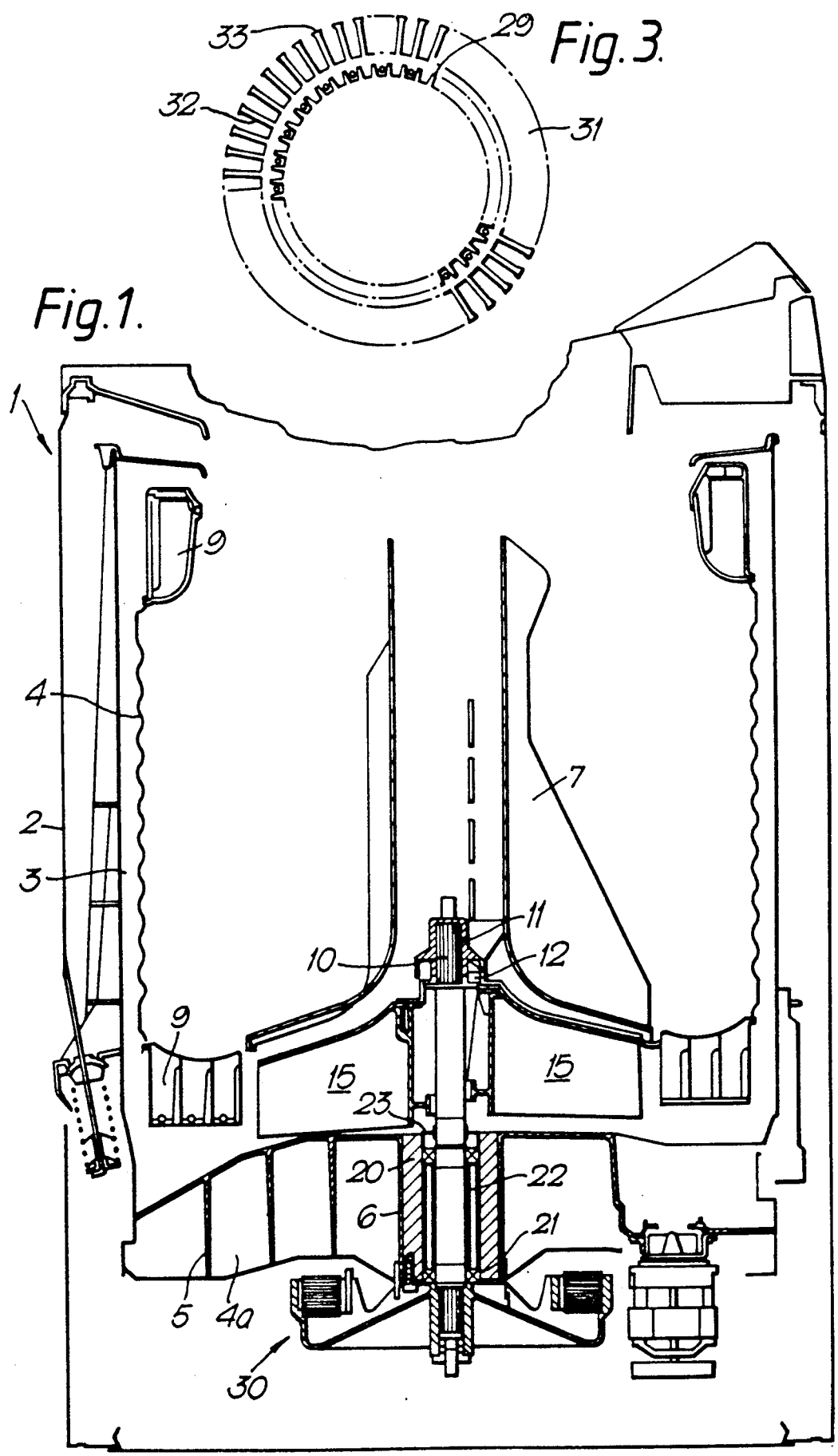
FIG. 1 is a diagrammatic cross sectional view of a laundry machine constructed according to the invention.

Referring to the drawings, a laundry machine 1 is provided having an outer casing 2 and a container 3 which in use contains water in which clothes are to be laundered. The container 3 is preferably an injection molding of a plastics material having reinforcing ribs 4a and 5. The ribs 4a and 5 support a bearing tube 6 preferably having a metal, e.g. an aluminum alloy, extrusion liner 8 molded in the tube 6 when the container 3 is being injection molded. The liner 8 is preferably shaped in plan view to provide four wings into which motor mounting screws 65 extend. Mounted within the container 3 is a spin tub 4 having balancing rings 9 and mounted within the spin tub is an agitator 7. The agitator is mounted on and driven by a shaft 10 the driving being effected by splines 11 engaging corresponding parts 12 of the agitator. The described laundry machine also includes a clutch arrangement operated by a float 15 which is shown in a lower engaging position on the left hand side of FIG. 1 and an upper disengaged position as shown in the right hand side. The operation of this float in connecting and disconnecting the spin tub 4 from the agitator 7 is fully described in European Patent Specification No. 7301868.3 which specification is incorporated herein by reference.

Figure 2:
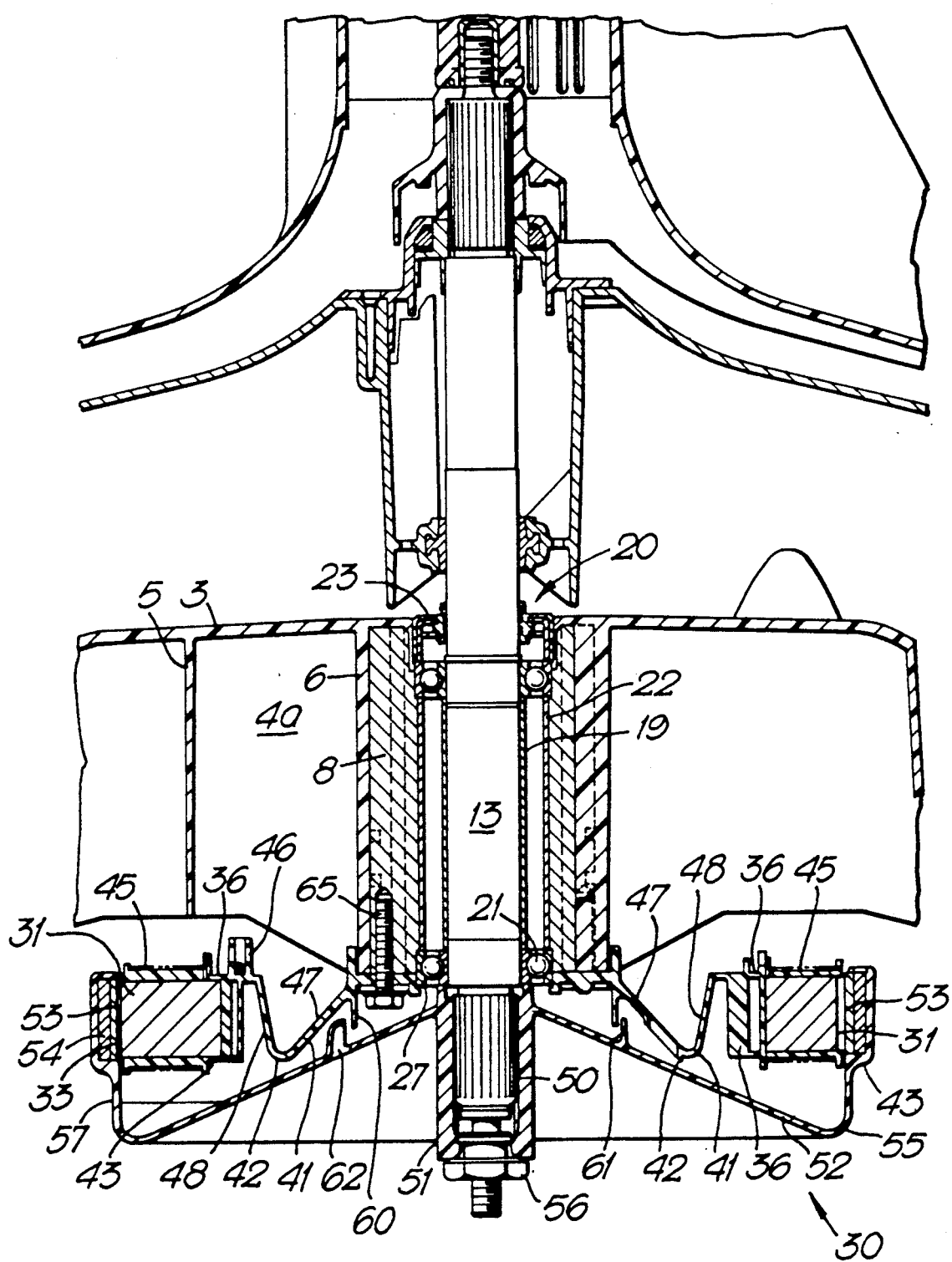
FIG. 2 is an enlarged cross-sectional view of the drive mechanism forming part of the laundry machine of FIG. 1.

The shaft 13 is mounted in an upper distal bearing 20 (FIG. 2) and a lower proximal bearing 21. The upper bearing 20 is mounted within the bearing tube 6 and the two bearings are separated by spacers 19 and 22. A seal 23 of known form is provided to seal the shaft 13 from the bearing tube 6.

The drive mechanism of the laundry machine above described includes an electric motor generally referenced 30 which in the preferred form is an inside out salient pole electronically commutated motor (herein referred to as an ECM). The ECM 30 is constructed according to the invention as follows:

A ferromagnetic magnetizable member 31 (FIG. 3) is provided having salient poles 32, the poles 32 extending outwardly from a yoke 29 and the poles 32 having pole faces 33 lying on an outer circumference. The stator member 31 is manufactured by punching the poles 32 and yoke 29 out of a strip of electrical steel having a lightly insulated surface and then curving the strip of steel on edge into a continuous helix arranged with adjacent coils of steel having the light insulation thereon touching. The continuous helix is wound so that the resulting ferromagnetic magnetizable member has an outside diameter which is slightly larger the preferred outside diameter of the stator member 31 in it's completed form. The adjacent coils of steel are riveted together to maintain the desired shape. The plan shape is shown in FIG. 3.

Figure 4:
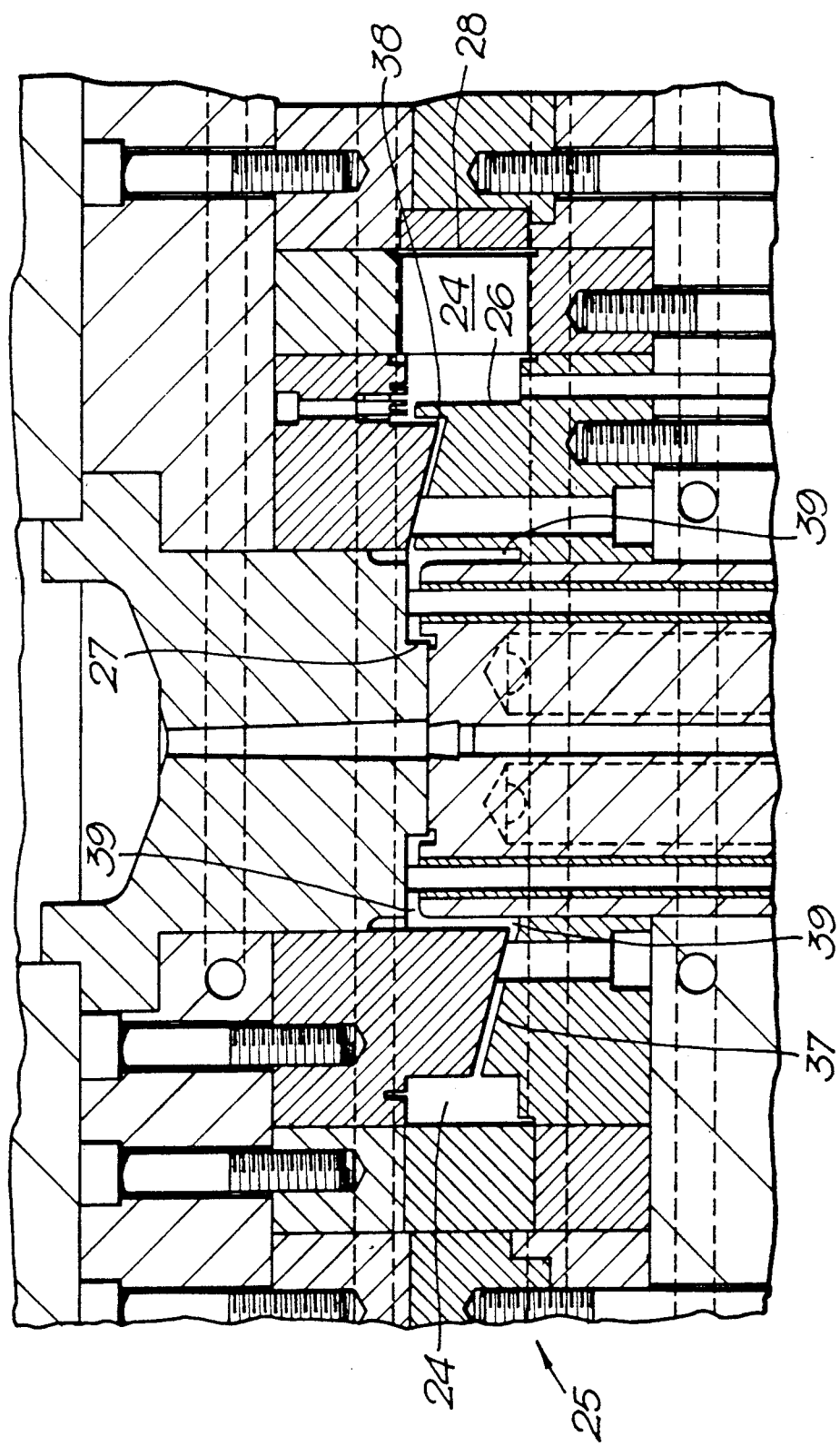
FIG. 4 is as enlarged sectional cross view of part of an assembled die containing cavities in which a stator according to the invention is molded.
Figure 5:
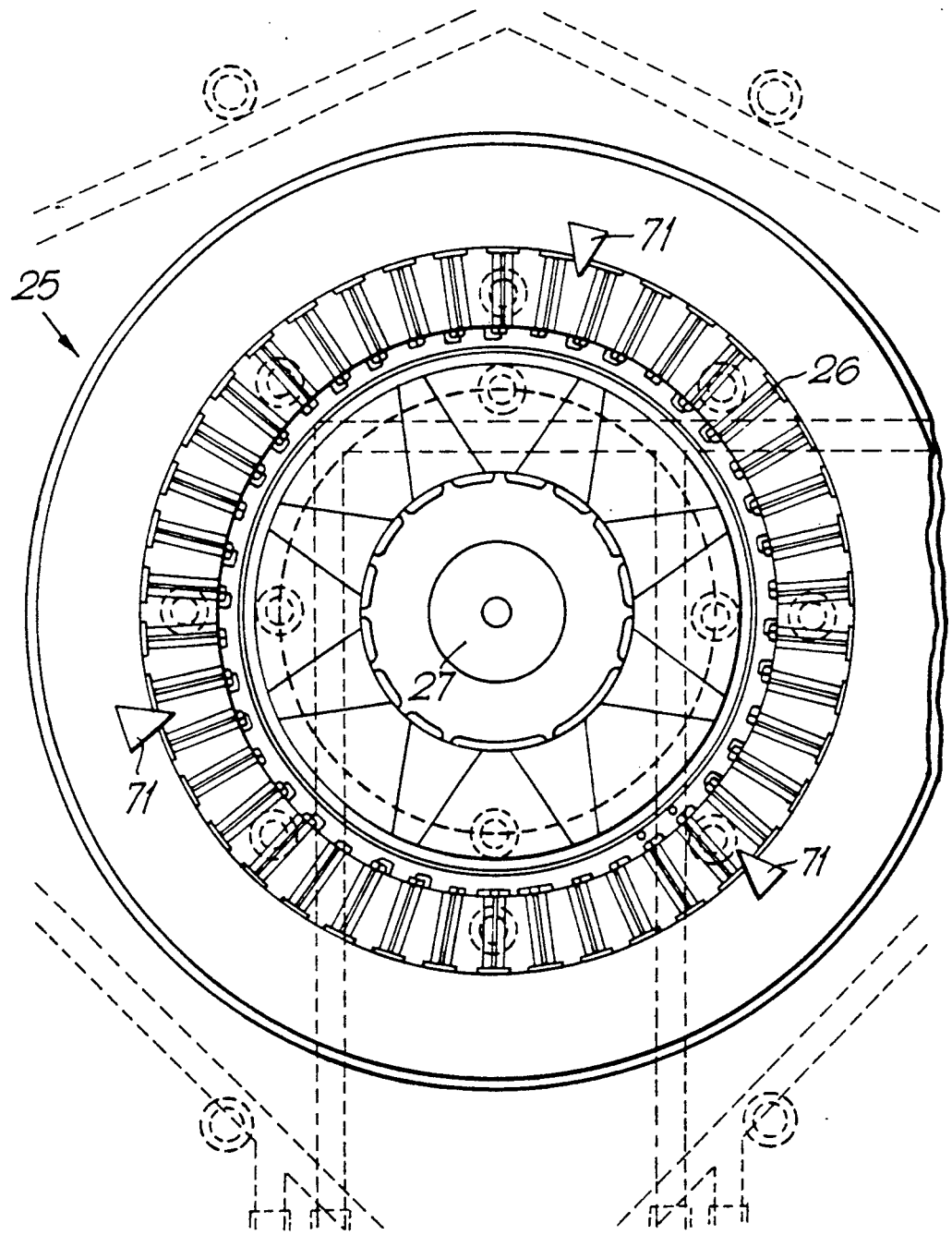
FIG. 5 is a plan view of the die shown in part in FIG. 4.

To provide a frame for the stator the stator member 31 is fitted in a space 24 of die 25 (FIG. 4) with the pole faces 33 a close fit against a face 28 of a part of the die. The outside diameter of stator member 31 is shaped precisely by three sliding cones 71, spaced 120° apart, which move radially toward the center of bearing mounting 27 (FIG. 5) A plastics material, preferably a Dupont Rynite FR543 plastics material, is injected to encase the stator member 31, with the exception of the pole faces 33, in the plastics material. The position of the pole faces 33 is accurately determined by angled pins (not shown) and the poles 32 are mounted over shaped portions 26 of the die as may be seen in FIG. 5. The die also includes provision to provide a shaft carrier mounting comprising a bearing mounting 27 in which the bearing 21 is later fitted to carry the shaft 13. The die 25 has shaped cavities 37, 38, 39 and otherwise to provide the shape of the stator frame as may be seen in FIG. 2.

Referring now to that figure, the web 41 of the stator frame connects the plastics molded section 36 to the bearing mounting 27. The web 41 has an annular shape containing a V shaped portion 42 between a frustum of a cone portion 47 directed in one direction to a further frustum of a cone portion 48 directed away from the annular V shaped portion 42 between the two portions 47 and 48. This shape has been found satisfactory in that after the plastics material has been injected, any changes in volume thereof due to contraction of the plastics material while cooling result in changes of shaped portion, for example, of the V shape 42 or change of angle between the portions 47 and 48 rather than varying the relative position of the bearing mounting 27 and the encasement 36 which encases the stator member 31 which in particular is fixed in position by the engagement of the pole faces 33 with the die face 28. The injection moldings also covers the pole pieces except the faces thereof with the plastics material giving electrical insulation 45 to such pole pieces. At a later stage, a protective coating is applied to the pole faces eg. by spraying.

The moldings produced also provides terminal sockets 46. When the poles are wound the winding machinery places tails of winding wires automatically in the terminal sockets 46 and external wiring connections of spade type are then inserted in the sockets 46 giving a scraping action on the winding wires placed in the sockets 46, the insertion baring the tails of those wires and making electrical connection as desired.

To provide a rotor for the motor having a plastics rotor web and hub, a die is provided, and that die includes removeable members 66 and 67 (FIG. 6) which fits in a further die part 68 and associated with the die parts 66 and 67 is a further male die part 69.

In use a series of pieces of magnetizable material (herein referred to as magnets) are placed in an unmagnetized condition in position in prepared slots (not shown) in the removable piece 67 and one such magnet is shown at 53 in FIG. 6. The magnets are later magnetized in a separate process to be permanently magnetized in the known way. The material is preferably of the Neodymium type. The magnets are held in place by friction, being a reasonably tight fit in the slots or otherwise held temporarily in position and a strip of lightly insulated ferromagnetic material (steel) is then wound into a spiral coil in a clock spring manner over the magnets and in contact therewith until a suitable thickness is built up. The steel is shown at 54 in FIGS. 2 and 6. In order to resist forces acting during cooling the plastics web and hub of the rotor after molding, adjacent turns of the steel are fixed to each other preferably by the use of a suitable adhesive such as Loctite 290. The magnets are then held in a fixed position on the face of the removable die member 67 and the steel 54 is locked into a substantially solid form by the adhesive with the inner surfaces of the magnets each maintained in a circumferential position. The die parts are then assembled with the part 67 carrying the steel 54 and magnets 53 in position as shown in FIG. 6. A plastics material preferably Rynite 545 made by Dupont is injected into the closed die parts.

In the preferred form for injection molding both the stator and the rotor, the plastics material is injected at 290°–300° C. into the die parts which are maintained at 100° C. After injection, the die remains closed for about 15 seconds and the male and female die parts then separated. Ejection pins then eject the molded part almost immediately. The plastics material encases the steel and all of the surfaces of the magnets except the face in contact with the die surface.

In the finished rotor, the web injected into space 58 of the die interconnects the encased steel 54 and magnets 53 to hub 51. The web 52 is formed to a shape such and the fixing of the steel and the magnets in the die is such that distortion of the position of the hub relative to the magnets and particularly concentricity are controlled during cooling of the plastics material to die temperature. An extended frustum of a cone shape of the portion 52 passing through an annular change of direction of the base of an V 55 from the cylindrical portion 57 to the plastics material 43 encasing the magnets and steel has been found satisfactory in this respect. Thus the web 52 is formed into a shape which resists distortion of the portion of the hub relative to the permanent magnets and we have found that a cone shape changing through a V shape to a cylinder is satisfactory in this respect.

Referring again to FIG. 2 the hub 51 is held in place on the shaft 11 by a screwed cap 56. A useful adjunct to the invention is the provision of a downwardly directed short cylinder 60 on the stator member 47 and this co-acts with an upstanding cylindrical member 61 on the rotor member 52 so that should the seal 23 leak, water will pass downwardly to be expelled through apertures 62 in the rotor.

The number of poles in the stator and the rotor may be varied but for example for a 42 pole stator 56 permanent magnets are spaced equi-distantly on the rotor.

The lower end of the shaft 13 has a splined portion 50 and the hub 51 of the rotor is mounted on this splined portion.

During assembly the bearing 21 is placed with its outer race partly in the bearing mounting 27 and partly in the extruded liner 8.

The above construction has the advantage that an electric motor may be made by a plastics injection process in which in particular the bearing 21 maintains its concentricity relative to the pole faces 33 and thus enables a motor to be produced very quickly and very easily. Also the mounting of the tube 6 in the injection molding of the outer container 3 enables the shaft 13 to be mounted quickly and readily. The whole arrangement has the advantage that the motor may be dismounted quickly and easily by undoing the cap 56, removing the rotor and then undoing screws 65 so that the motor may be dropped from the tube 6. The shaft may then be withdrawn and the bearings replaced if necessary.

Although the preferred form of the invention has been described in relation to a laundry machine in which the shaft 11 drives an agitator it will be apparent that the invention, particularly though not solely the method of manufacturing the motor frame, will be applicable to other drives where a pair of bearings rotatably support not only the motor rotor, but also a rotatable part of a machine of which the motor and drive form parts.

We claim:

1. A method of manufacturing an inside out salient pole stator of an electric motor having a ferromagnetic circuit including a set of poles having pole faces, said poles being adapted to receive electrical windings thereon and being spaced radially from a shaft carrier mounting means comprising:

providing a strip of lightly insulated ferromagnetic material shaped with poles extending from a yoke portion;

winding said strip of ferromagnetic material edgewise and helically thereby providing a plurality of radially outwardly directed laminated poles extending from a radially disposed yoke and having radially outward facing pole faces thereon thereby forming a ferromagnetic circuit, adjacent laminations being separated only by said light insulation;

providing a plastics injection molding die having walls defining a cavity for receiving injection molding plastics material including wall portions defining a part of said cavity for forming a shaft carrier mounting means, and a cylindrical face therein;

fixing said ferromagnetic circuit as an integral unit in said plastics injection molding die with said pole faces in closely fitting relationship against said cylindrical face of said die;

injecting a plastics material into said die cavity thereby forming a plastics molding having said ferromagnetic circuit, except said pole faces, embedded therein, a shaft carrier mounting means and a web between said embedded ferromagnetic circuit and said shaft carrier mounting means as parts thereof;

cooling said plastics material; and holding said pole faces and shaft carrier mounting means in fixed position relative to each other thereby maintaining substantial concentricity between said pole faces and said shaft carrier mounting means during said cooling of said plastics material.

2. The method as claimed in claim 1 and further comprising: forming said shaft carrier mounting means as a housing; and forming a shaft bearing mounting portion on said housing.

3. The method as claimed in claim 2 and further comprising:

forming said web in a manner which produces an annular V shaped portion in a position for facilitating a change in said V shaped portion by contraction of said plastics material during cooling thereof without varying the relative position and concentricity of said shaft carrying mounting means and said pole faces.

4. The method as claimed in claim 1 and further comprising:

forming said web in a manner which produces an annular V shaped portion in a position for facilitating a change in said V shaped portion by contraction of said plastics material during cooling thereof without varying the relative position and concentricity of said shaft carrying mounting means and said pole faces.

5. The method as claimed in claim 4 and further comprising: forming terminal sockets integral with said plastics molding.

6. The method as claimed in claim 2 and further comprising: forming terminal sockets integral with said plastics molding.

7. The method as claimed in claim 1 and further comprising:

forming terminal sockets integral with said plastics molding.

8. The method as claimed in claim 1 and further comprising:

providing three equally spaced sliding cones movable radially with respect to said stator member for positioning the cylindrical face of said die; and precisely setting the outer diameter of said stator member by moving said cones radially inwardly.

* * * * *